March 2, 1937.  S. B. SCHWARTZ  2,072,385
DISSOLVING APPARATUS
Filed Nov. 18, 1935
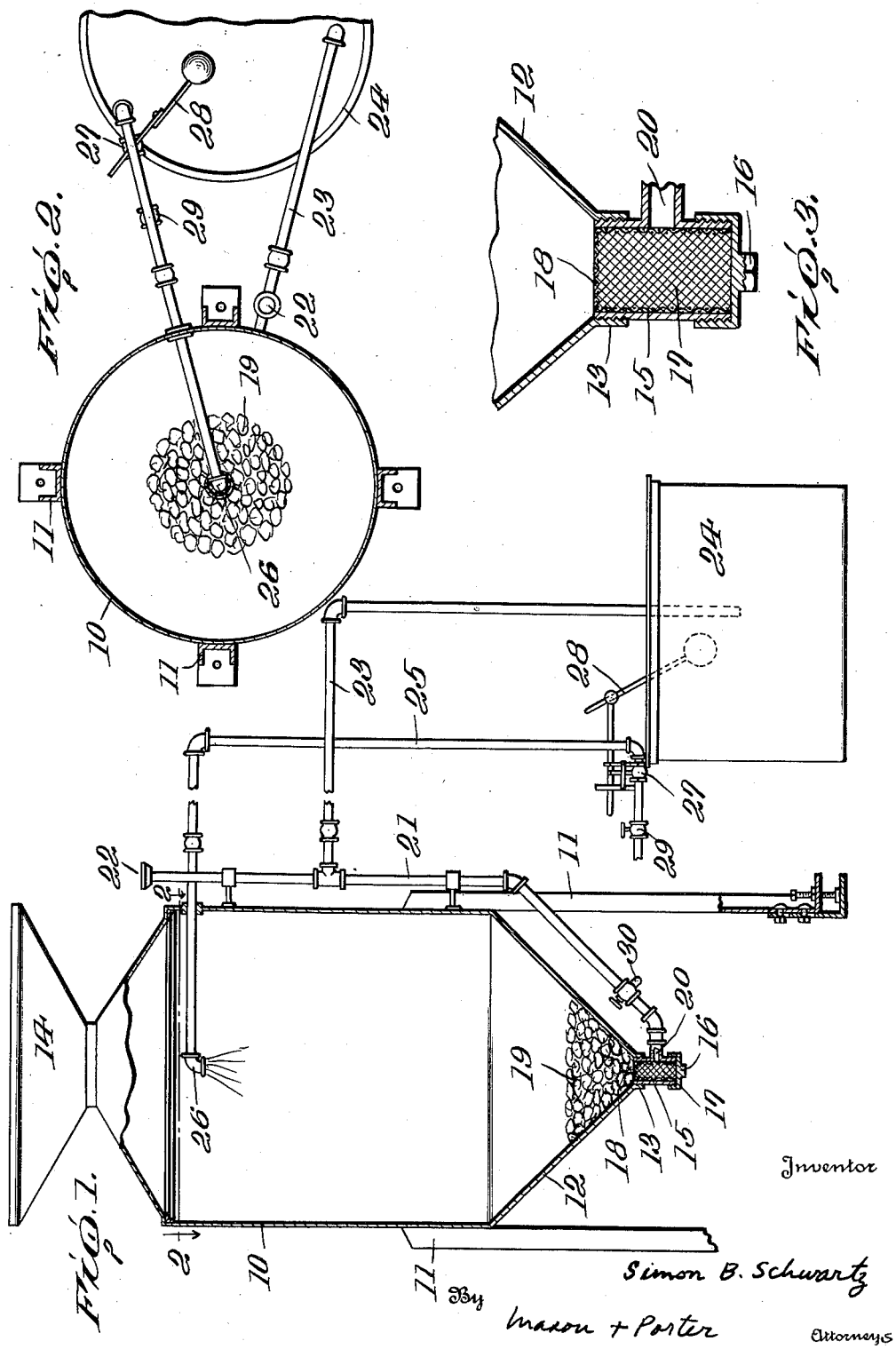
Inventor
Simon B. Schwartz
By Mason + Porter
Attorneys Patented Mar. 2, 1937

2,072,385

UNITED STATES PATENT OFFICE 2,072,385

DISSOLVING APPARATUS

Simon Bernard Schwartz, New Orleans, La., assignor to Myles Salt Company, Ltd., New Orleans, La., a corporation of Louisiana Application November 18, 1935, Serial No. 50,467

3 Claims. (Cl. 23—272.1)

The present invention relates to new and useful improvements in an apparatus for dissolving soluble substances and more particularly to a salt dissolving apparatus.

An object of the invention is to provide a salt dissolving apparatus which is simple in construction, inexpensive to manufacture, and capable of producing a substantially continuous supply of large quantities of the saturated brine which is clear and free from objectionable impurities.

A further object of the invention is to provide a salt dissolving apparatus wherein a gravel bed is employed in the dissolving vat for retaining the salt bed and for preventing the passage of any objectionable matter with the brine.

A further object of the invention is to provide a salt dissolving apparatus, of the above type, wherein means are provided for controlling the delivery of a solvent to the salt bed so that a constant and uniform supply of brine may be maintained.

The above and other objects will in part be obvious and will be hereinafter more fully described.

In the accompanying drawing:

Fig. 1 is a side elevation partly in section showing the salt dissolving apparatus.

Fig. 2 is a top plan view of the same taken along the line 2—2 of Fig. 1.

Fig. 3 is an enlarged detail view in section showing the brine outlet pipe and the retaining screen.

The present invention relates generally to a salt dissolving apparatus for producing a clear colorless solution from common rock salt. Rock salt from the mine is seldom pure and usually contains impurities in varying quantities. Brine made from such salt in the usual manner carries impurities which discolor the solution and which render it unfit for use where a clear colorless solution is required.

Referring more in detail to the accompanying drawing, there is shown a vat 10 which is carried by upright supports 11. The vat is provided with a conical bottom wall 12 which terminates in an internally threaded opening 13. A hopper 14 is mounted on the upper end of the vat 10 for the purpose of delivering thereto the salt to be dissolved. Threadedly engaging the opening in the bottom of the vat is a pipe connection 15, the lower end of which is closed by a plug 16. A retaining screen 17 having a screened upper end 18 is closely fitted in the pipe 15. There is a gravel bed 19 in the bottom of the conical portion 12 of the vat 10. The screen 17 is of sufficient fineness to prevent the passage therethrough of any particles of the gravel bed 19. The gravel bed, in turn, prevents the passage of any particles of salt or impurities therethrough and thus serves as a retaining bed for the salt which is delivered to the vat from the hopper 14.

The pipe 15 is provided with a laterally extending outlet 20 which communicates with an outlet pipe line 21 extending upwardly on the outside of the vat 10 to a substantial height. The end 22 of the pipe 21 is opened to the atmosphere. Below the end 22 of the pipe 21 is a delivery pipe line 23 which communicates with a brine supply tank 24.

Water or other solvent is admitted through a pipe line 25 to a nozzle 26 located centrally within and near the top of the vat 10. The pipe line 25 is provided with a valve 27 which is controlled by a float 28 responsive to the brine level in the supply tank 24.

In the operation of the apparatus, salt is delivered through the hopper 14 to the vat 10 until it reaches a level just below the nozzle 26. The gravel bed 19 serves as a retaining means for the salt and prevents the passage therethrough of salt particles or other impurities. Water is admitted through the pipe 25 and is sprayed on the salt by the nozzle 26. The water percolates downwardly through the mass of salt, becoming saturated in the course of its downward flow, then passing through the gravel bed 19 which removes any impurities or suspended particles therefrom. The saturated brine solution then passes through the screen 17 and the outlet 20 into the pipes 21 and 23 and finally is delivered to the brine supply tank 24. As the brine level rises in the tank 24, the float 28 will be raised, causing the valve 27 to be closed at a predetermined level, thus shutting off the water supply through the pipe 25. As the brine is drawn off from the tank 24, the float 28 will descend, thus opening the valve 27 and admitting water to the vat 10.

It is to be particularly noted that the gravel bed 19 prevents the passage of any salt particles therethrough and also prevents the passage of impurities or particles suspended in the saturated brine as it passes into the outlet 20. The screen 17 serves as a retaining means for preventing the passage into the oulet 20 of any particles constituting the gravel bed 19. The mass of salt in the vat 10 is constantly replenished through the hopper 14. The opening 22 of the pipe 21 serves as a vent to prevent any siphoning of the brine into the brine tank 24 when the valve 27 is closed.

When it is necessary to clean the apparatus, a manually controlled valve 29 is closed, thereby stopping the flow of water through the pipe 25. Similarly, a manually controlled valve 30 is closed to prevent the escape of any brine remaining in the pipe 21. The plug 16 may be removed and the screen 17 also removed. This will permit the gravel to empty out of the vat so that it may be washed or so that new gravel may be placed therein. By opening the valve 29, the vat may be flushed out. To refit the apparatus for use, the screen 17 is inserted in the pipe 15 and the plug 16 is screwed on. The gravel may then be admitted to the hopper to constitute the gravel retaining bed 19.

The gravel bed 19 aids in greatly increasing the quantity of solution which may be obtained from the apparatus in a given period of time for the reason that the gravel bed presents a relatively large retaining area on which the mass of salt is supported, so as to facilitate the passage of the solution through the apparatus. It is to be understood that the apparatus can be used in dissolving any soluble substance where a clear liquid is desired.

It is obvious that minor changes in the details of construction and arrangement of parts may be made without departing from the scope of the invention as set forth in the appended claims.

I claim:

1. A dissolving apparatus comprising a vat for solid material to be dissolved, said vat having a downwardly tapered bottom wall terminating in an outlet opening, an outlet pipe depending from said opening, a screen fitted in said outlet pipe, a gravel bed located within said vat and covering the opening in the bottom wall thereof whereby to prevent the passage therethrough of solid particles while permitting the passage therethrough of the solution, said screen serving to support the gravel bed and to prevent the passage of the gravel into the outlet pipe, a plug closing said outlet pipe and serving to support the screen therein, a hopper for delivering the solid material to the vat, means for admitting a solvent to the mass of solid material in the vat, and a delivery pipe connected to said outlet pipe intermediate the ends thereof and extending upwardly on the outside of said vat whereby to maintain a definite liquid level in the vat.

2. A dissolving apparatus comprising a vat for solid material to be dissolved and having an opening through the bottom thereof, an outlet pipe connected to said opening, a gravel bed within said vat covering said opening whereby to prevent the passage therethrough of solid particles but permitting the passage therethrough of the solution, a retaining screen fitted in said outlet pipe and serving to support the gravel bed and to prevent the passage through the screen of the gravel, a removable plug in said outlet pipe permitting said screen to be removed so that the vat may be emptied and washed, a hopper for delivering the solid material to the vat, means for admitting a solvent to the mass of solid material in the vat, and a delivery pipe connected to said outlet pipe and extending upwardly on the outside of said vat whereby to maintain a definite liquid level in said vat.

3. A dissolving apparatus comprising a vat for solid material to be dissolved and having an opening through the bottom thereof, an outlet pipe connected to said opening, a gravel bed within said vat covering said opening whereby to prevent the passage therethrough of solid particles but permitting the passage therethrough of the solution, a retaining screen fitted in said outlet pipe and serving to support the gravel bed and to prevent the passage through the screen of the gravel, a removable plug in said outlet pipe permitting said screen to be removed so that the vat may be emptied and washed, a hopper for delivering the solid material to the vat, means for admitting a solvent to the mass of solid material in the vat, a delivery pipe connected to said outlet pipe and extending upwardly on the outside of said vat whereby to maintain a definite liquid level in said vat, a solution tank into which said delivery pipe empties, and means responsive to the solution level in said tank for controlling the admission of the solvent to said vat.

SIMON BERNARD SCHWARTZ.